United States Patent
Kuo et al.

(10) Patent No.: US 8,559,061 B2
(45) Date of Patent: Oct. 15, 2013

(54) AUTOMATIC CROSS-TRACK DENSITY CORRECTION METHOD

(75) Inventors: Chung-Hui Kuo, Fairport, NY (US); Stacy M. Munechika, Fairport, NY (US); Michael Thomas Dobbertin, Honeoye, NY (US)

(73) Assignee: Eastman Kodak Company, Rochester, NY (US)

( * ) Notice: Subject to any disclaimer, the term of this patent is extended or adjusted under 35 U.S.C. 154(b) by 97 days.

(21) Appl. No.: 13/178,717

(22) Filed: Jul. 8, 2011

(65) Prior Publication Data

US 2013/0010312 A1    Jan. 10, 2013

(51) Int. Cl.
  *G06F 15/00* (2006.01)
  *G06K 1/00* (2006.01)

(52) U.S. Cl.
  USPC .............. 358/1.9; 358/518; 399/341; 399/49

(58) Field of Classification Search
  USPC ............................ 358/1.9, 518; 399/341, 49
  See application file for complete search history.

(56) References Cited

U.S. PATENT DOCUMENTS

| | | | |
|---|---|---|---|
| 4,827,279 A | 5/1989 | Lubinsky et al. |
| 4,989,047 A | 1/1991 | Jugle et al. |
| 5,053,866 A | 10/1991 | Johnson |
| 5,546,165 A | 8/1996 | Rushing et al. |
| 5,684,568 A | 11/1997 | Ishikawa et al. |
| 5,790,240 A | 8/1998 | Ishikawa et al. |
| 5,946,006 A | 8/1999 | Tajika et al. |
| 5,997,123 A | 12/1999 | Takekoshi et al. |
| 6,034,710 A | 3/2000 | Kawabe et al. |
| 6,287,027 B1 | 9/2001 | Kumiya et al. |
| 6,554,388 B1 | 4/2003 | Wong et al. |
| 6,819,352 B2 | 11/2004 | Mizes et al. |
| 2002/0057470 A1 | 5/2002 | Koide et al. |
| 2002/0075379 A1 | 6/2002 | Klassen et al. |
| 2004/0252905 A1 | 12/2004 | Mizes et al. |
| 2005/0036705 A1 | 2/2005 | Viassolo et al. |
| 2005/0099446 A1 | 5/2005 | Mizes et al. |
| 2005/0254739 A1 | 11/2005 | Parampil et al. |
| 2006/0001911 A1 | 1/2006 | Viassolo et al. |
| 2006/0071185 A1 | 4/2006 | Mizes et al. |
| 2006/0071963 A1 | 4/2006 | Sampath et al. |

(Continued)

FOREIGN PATENT DOCUMENTS

WO  WO 2011/059418  5/2011

*Primary Examiner* — Twyler Haskins
*Assistant Examiner* — Michael Burleson
(74) *Attorney, Agent, or Firm* — Roland R. Schindler, II

(57) ABSTRACT

Methods are provided for automatic cross-track density correction for a print engine having a print head that forms lines of picture elements on a receiver based upon lines of pixel values. In one aspect of the method, the print engine is caused to print a first print having a plurality of different areas along a cross-track direction with target densities and data is received from which measured densities for different ones of the plurality of different areas can be determined. A line density adjustment function is based upon a functional relationship between a cross track position of different ones of the areas and a difference between the measured density and the target density at the different ones of the areas. A production print is subsequently printed according to lines of pixel values for the production print modulated by the line density adjustment function.

9 Claims, 14 Drawing Sheets

(56) References Cited

U.S. PATENT DOCUMENTS

| | | |
|---|---|---|
| 2006/0077488 A1 | 4/2006 | Zhang et al. |
| 2006/0227391 A1 | 10/2006 | Updegraff |
| 2007/0103707 A1* | 5/2007 | Klassen .................. 358/1.9 |
| 2007/0139733 A1 | 6/2007 | Mizes et al. |
| 2010/0097657 A1 | 4/2010 | Kuo et al. |
| 2010/0202811 A1* | 8/2010 | Hryhorenko et al. ......... 399/341 |
| 2012/0251141 A1* | 10/2012 | Henderson et al. ............. 399/49 |

* cited by examiner

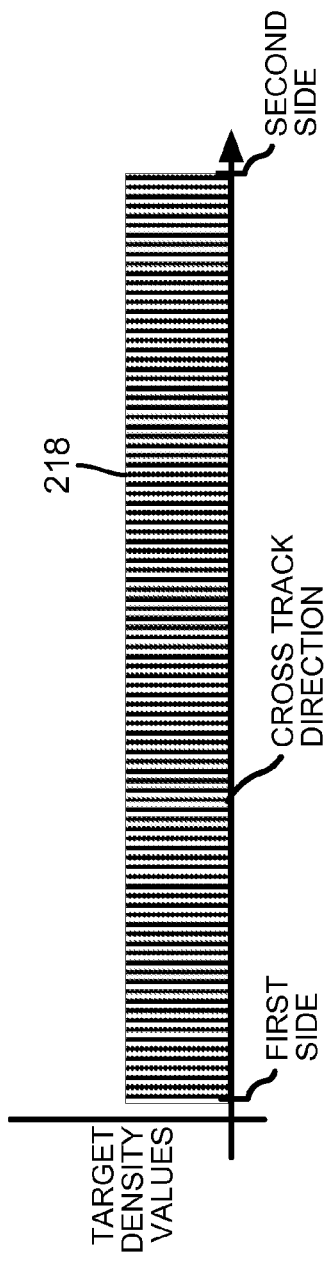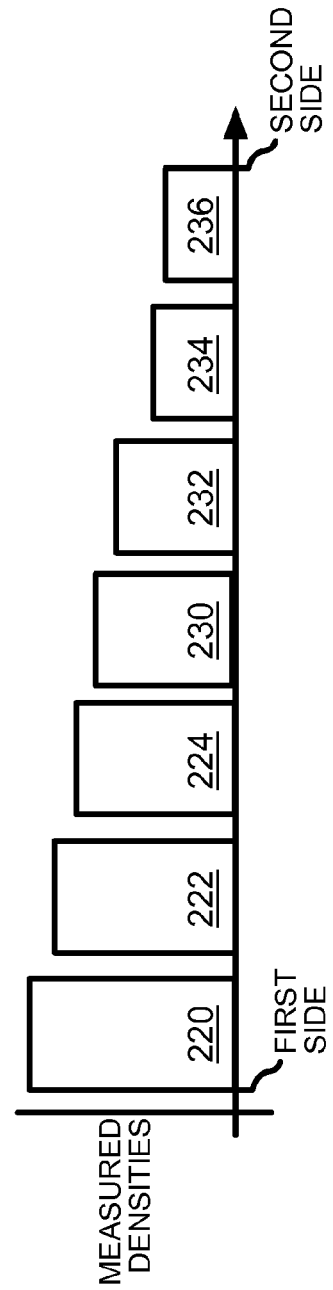
FIG. 7A
FIG. 7B

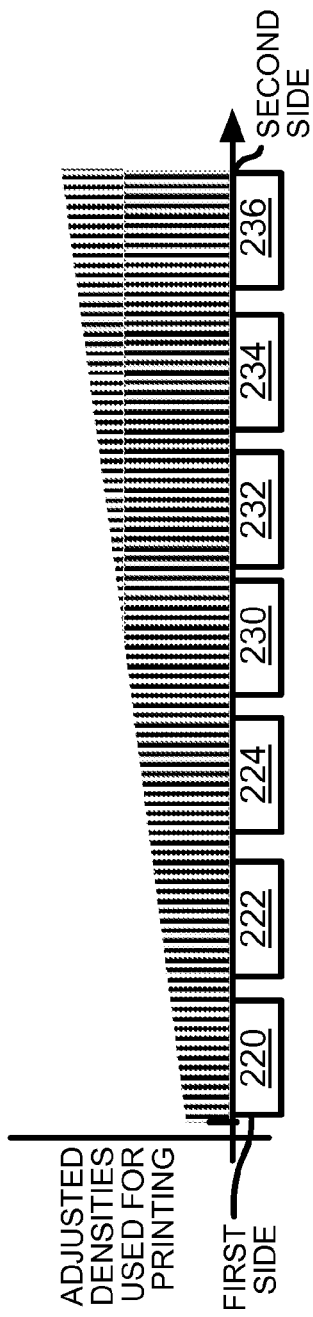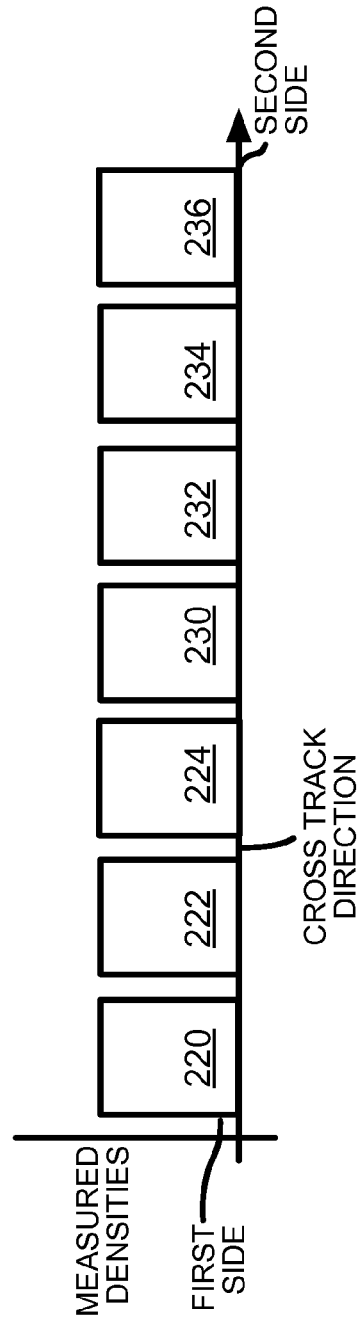

AUTOMATIC CROSS-TRACK DENSITY CORRECTION METHOD

CROSS REFERENCE TO RELATED APPLICATIONS

This application relates to commonly assigned, copending U.S. application Ser. No. 13/178,726, filed Jul. 8, 2011, entitled: "PRINTER HAVING AUTOMATIC CROSS-TRACK DENSITY CORRECTION" which is hereby incorporated by reference.

FIELD OF THE INVENTION

This invention pertains to the field of printing, and, in particular to digital printers.

BACKGROUND OF THE INVENTION

Over the past few decades computer aided graphic design software and desk top publishing software have become ubiquitous. Such software allows rapid and efficient production of digital image files that can be used to print books, magazines, pamphlets and other types of documents. Frequently such digital image files are printed using digital printing solutions such as electrophotographic printers, laser printers or ink jet printers.

Such digital printing solutions typically use a print head that is capable of printing lines of image picture elements (pixels) across a printing width. These print heads can form pixels having different densities. During printing, image data in an electronic image file is converted into a sequence of lines of printing instructions. The printing instructions include data from which the print head can determine a density to be printed at each of the pixels. The lines are printed sequentially to form a printed image that has an appearance that represents the image data in the electronic image file.

It will be appreciated from this that proper operation of such digital printers requires that the print head responds to printing instructions at the different pixel location in a generally uniform manner. That is, to achieve uniform density output from a digital printer, that the density printed at any individual engine pixel location cannot significantly vary from the density printed at any other individual engine pixel location.

Density non-uniformities in a print can interrupt the continuity of image content in a print and create unacceptable print artifacts. In particular, even subtle non-uniformities that rise in high quality photographic type images and graphics art content can become readily apparent because they interrupt subtle natural variations of photographs and can disrupt the flat fields having the same density that are often found in graphic images and in text.

Factors that contribute to printer non-uniformity vary, depending on the specific printing technology. With a thermal print head, for example, where resistive print elements are linearly aligned along a writing surface, slight mechanical irregularities or additive mechanical tolerance variability can cause some elements to be more effective in transferring heat than others. With a print head that scans optically, such as a laser print head, optical aberrations or fringe effects can mean that light power is less effectively distributed at the extreme edges of the scan pattern than it is in the center of a scan line. In a printing system that uses an array of light-emitting elements, individual elements in the array may vary in the intensity of light emitted. These variations can be induced for example by thermal, mechanical or electrical variations in manufacturing, assembly, alignment, or in use.

These pixel-to-pixel variations can take various forms. In some instances these variations arise as high frequency variations that arise for example where an individual pixel has a density response that is markedly different from the density response of an adjacent pixel. Such variations typically cause image artifacts that form narrow streaks long the process direction of the print known as streaks. In other instances the pixel-to-pixel variations arise as mid-frequency variations where groups of adjacent pixels have a density response that is different from adjacent groups of pixels to form a pattern of areas having of different densities along the process direction. These mid-frequency variations provide areas that are known are known as bands and typically include groups of pixels that have a density response that is meaningfully different from adjacent groups of pixels.

Streaks and bands are objectionable print artifacts. There have been many efforts to provide systems that measure deviations in the density response at individual pixels or groups of adjacent pixels and that correct the operation of a printer to prevent these conditions. For example, there are a wide variety of automatic feedback and adjustment systems that use one form of color or density sampling or another to automatically calibrate the density response of individual picture elements in a print head so that determine adjustments to be made to the operation of a printing system to attempt to limit pixel to pixel image density variations. For example, U.S. Pat. No. 5,546,165 (Rushing et al.) which discloses non-uniformity correction applied in an electrostatic copier, using LED technology in transfer element. In the '165 patent, feedback measurements from a scanned, flat field continuous tone test print are obtained in order to calculate adjustments to individual LED drive currents or on-times.

Similarly, U.S. Pat. No. 5,684,568 (Ishikawa et al.) discloses non-uniformity correction applied in a printer used for developing photosensitive media. Light intensity from an exposure source employing an array of lead lanthanum zirconate titanate (PLZT) light valves controls image density at each pixel. This output light is measured to identify individual light valve elements that require adjustment for non-uniformity. The approach disclosed in the '568 patent corrects behavior of drive electronics for individual light valve elements, either controlling exposure time or light power level. To obtain and adjust non-uniformity data, this approach uses a basic sensor based feedback path.

U.S. Pat. No. 5,997,123 (Takekoshi et al.) discloses non-uniformity correction applied in an inkjet printer, where a transfer element comprises an array of nozzles. Control electronics are adjusted to modify dot diameter by controlling the applied nozzle energy or by modulating the number of dots produced. The approach disclosed in the Takekoshi et al. patent modifies the behavior of drive electronics assembly for individual inkjet nozzles in the printhead array. To obtain and adjust non-uniformity data, this approach uses the basic scanning device based feedback path. U.S. Pat. No. 6,034,710 (Kawabe et al.) discloses non-uniformity correction applied in a photofinishing printing apparatus that employs Vacuum Fluorescent Print Head (VFPH) technology for printheads 16. Again referring to FIG. 1, the approach disclosed in the Kawabe et al. patent modifies the behavior of drive electronics assembly 26 by adjusting the exposure time of individual elements in the VFPH array. To obtain and adjust non-uniformity data, this approach uses a basic sensor based feedback path. U.S. Pat. No. 5,946,006 (Tajika et al.) discloses non-uniformity correction applied in an inkjet printer, where transfer element 36 comprises an array of nozzles. Referring to FIG. 1, correction data goes directly to a printhead. To obtain and adjust non-uniformity data, this approach uses the basic scanning device based feedback path denoted.

U.S. Pat. No. 5,790,240 (Ishikawa et al.) discloses non-uniformity correction applied in a printer using PLZT (or LED or LCD) printing elements as transfer element 36. Referring to FIG. 1, a correction voltage is applied directly to drive an electronics assembly in order to adjust the output amplitude of an individual PLZT array element. Alternately, duration of the drive signal to an individual PLZT array element is adjusted at drive the electronics assembly. To obtain and adjust non-uniformity data, this approach uses a scanning device based feedback path.

U.S. Pat. No. 4,827,279 (Lubinsky et al.) discloses non-uniformity correction applied in a printer where a print head uses an array of resistive thermal elements to form a corresponding array of pixels. Density measurements are obtained for each individual thermal element and are used to determine correction factors. In the '279 patent a number of applied pulses or pulse duration at drive electronics are used in order to achieve uniformity. To obtain and adjust non-uniformity data, this approach uses a basic scanning device-based feedback path. With each of the conventional solutions noted above, non-uniformity correction is applied by making adjustments to drive electronics.

It will be appreciated from this prior art that it is well known to use feedback strategies to measure and modify the density response of individual pixels or groups of pixels pixel location to seek uniformity by way of adjusting each engine pixel response according to a difference from an aim.

Such approaches are particularly well suited to address high frequency and mid-frequency variations. However, these are not particularly well suited to addressing subtle pixel to pixel variations that occur at low frequencies such as pixel to pixel variations that arise as a product of variations that exist across the cross-track direction. Such low frequency variations can create subtle variations in pixel-to-pixel responses that can accumulate in the cross-track direction so as to give rise to meaningful variations in the density in a printed image. For example, the density of individual pixels near one edge of a cross-track direction can exhibit a noticeably different density response when compared to the density response of individual pixels near an opposite edge in the cross-track direction. These density variations are particularly noticeable in the appearance of a flat density field such as a line or other object that extends between the edges.

However, if the above described high frequency and mid-frequency compensation systems are left to address low frequency problems there is the potential that the low frequency variations can cause suboptimal compensation at any or all of these frequencies of variation. This of course can lead to unsatisfactory density responses. Alternatively, where there is no automatic compensation for low frequency problems the operator of the printer is required to visually identify such variations and make appropriate adjustments manually. This requires a great deal of skill.

It often falls to the operator of a digital printer to make manual adjustments that cause a printer to generate a print that, in the opinion of the operator, has an appearance that most accurately represents the appearance of the electronic image. For example, the printing of a photograph of a black cat on a snowy field is often problematical, with the imaging algorithm employed by the camera making the snow appear to be gray rather than white. Corrections to the density can be made by adjusting the digital data. However, it is time consuming to make adjustments to the digital data that is used to generate a print, thus it is difficult to adjust the image data to the characteristics of machine operation. Further, any adjustments that are made to the image data typically require that the image data be reprocessed into printing data in a time consuming raster imaging process.

Alternatively, many of the tools currently available to the operator of a printer to make at press density adjustments are frequently not precise enough to solve density problems that can impact a plurality of adjacent cells. For example, general density and contrast adjustments can be made that can help to minimize the extent to which density variations in an image are apparent. However, to use such approaches can cause the overall image to have an unintended appearance which in itself can be objectionable.

Printers, even when correctly set initially, can come out of adjustment during a print run. For example, in an electrophotographic print engine, the printing process depletes toner from the developer contained in the development station. Additional toner is inputted into the development station from a replenishment reservoir generally located at one end of the development station and the inputted toner is transported across the development station using known means such as paddles or feed augers. The localized depletion and replenishment of toner can result in density variations across the print while printing. Such variations are particularly objectionable as the customer can directly compare one print with another.

What is needed therefore is a new process control approach that enables a printer to effectively compensate for high frequency, mid-frequency and low frequency variations in pixel-to-pixel density response.

SUMMARY OF THE INVENTION

Methods are provided for automatic cross-track density correction for a print engine having a print head that forms lines of picture elements on a receiver based upon lines of pixel values. In one aspect of the method, the print engine is caused to print a first print having a plurality of different areas along a cross-track direction with target densities and data is received from which measured densities for different ones of the plurality of different areas can be determined. A line density adjustment function is based upon a functional relationship between a cross track position of different ones of the areas and a difference between the measured density and the target density at the different ones of the areas. A production print is subsequently printed according to lines of pixel values for the production print modulated by the line density adjustment function.

DETAILED DESCRIPTION OF THE DRAWINGS

FIGS. 7A-7D illustrate the determination of an adjustment function.

FIGS. 8A-8D illustrate the use of the adjustment function to control density responses in a line.

DETAILED DESCRIPTION OF THE INVENTION

Figure 1:
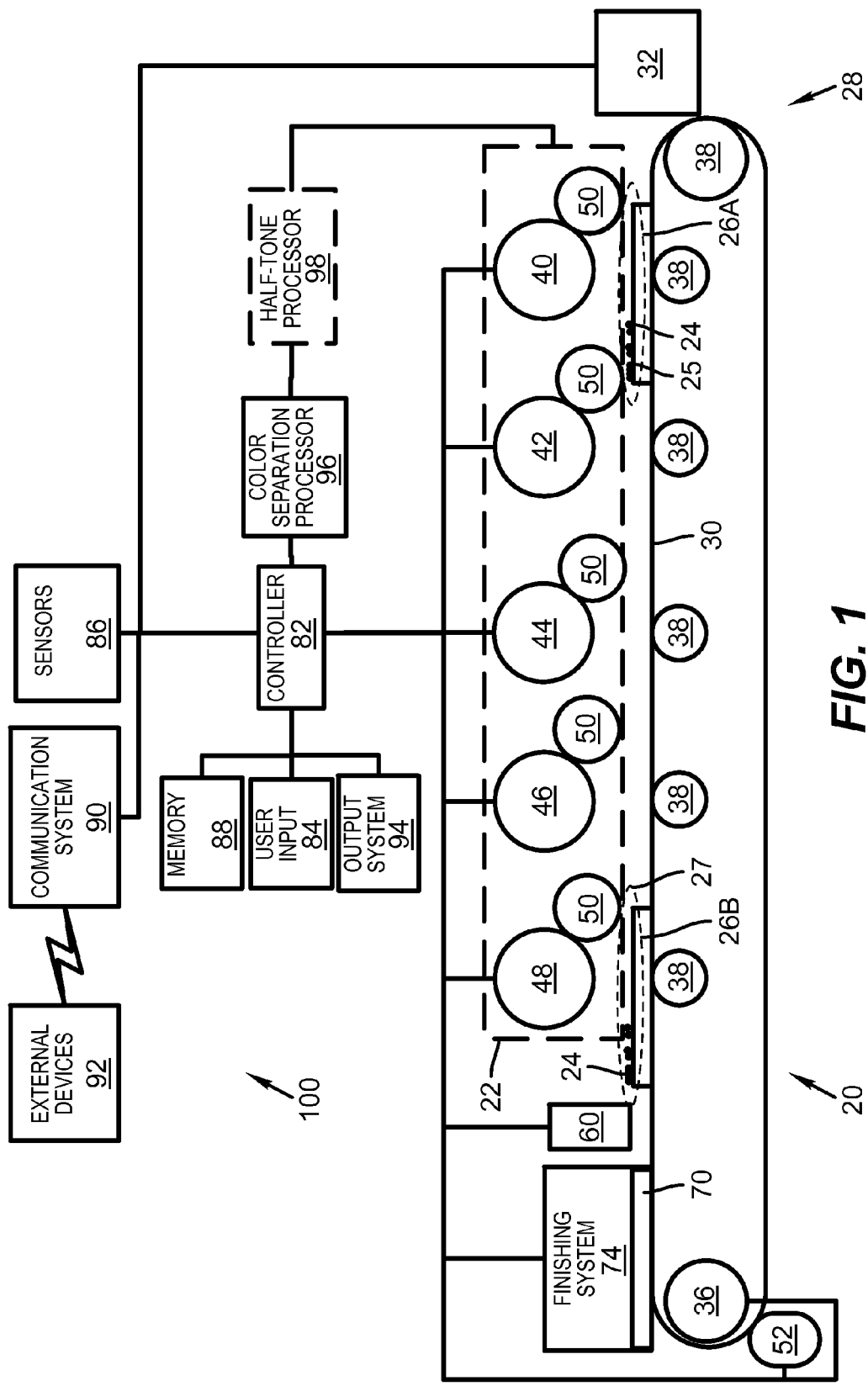
FIG. 1 shows a system level illustration of an electrophotographic embodiment of a printer.
Figure 2:
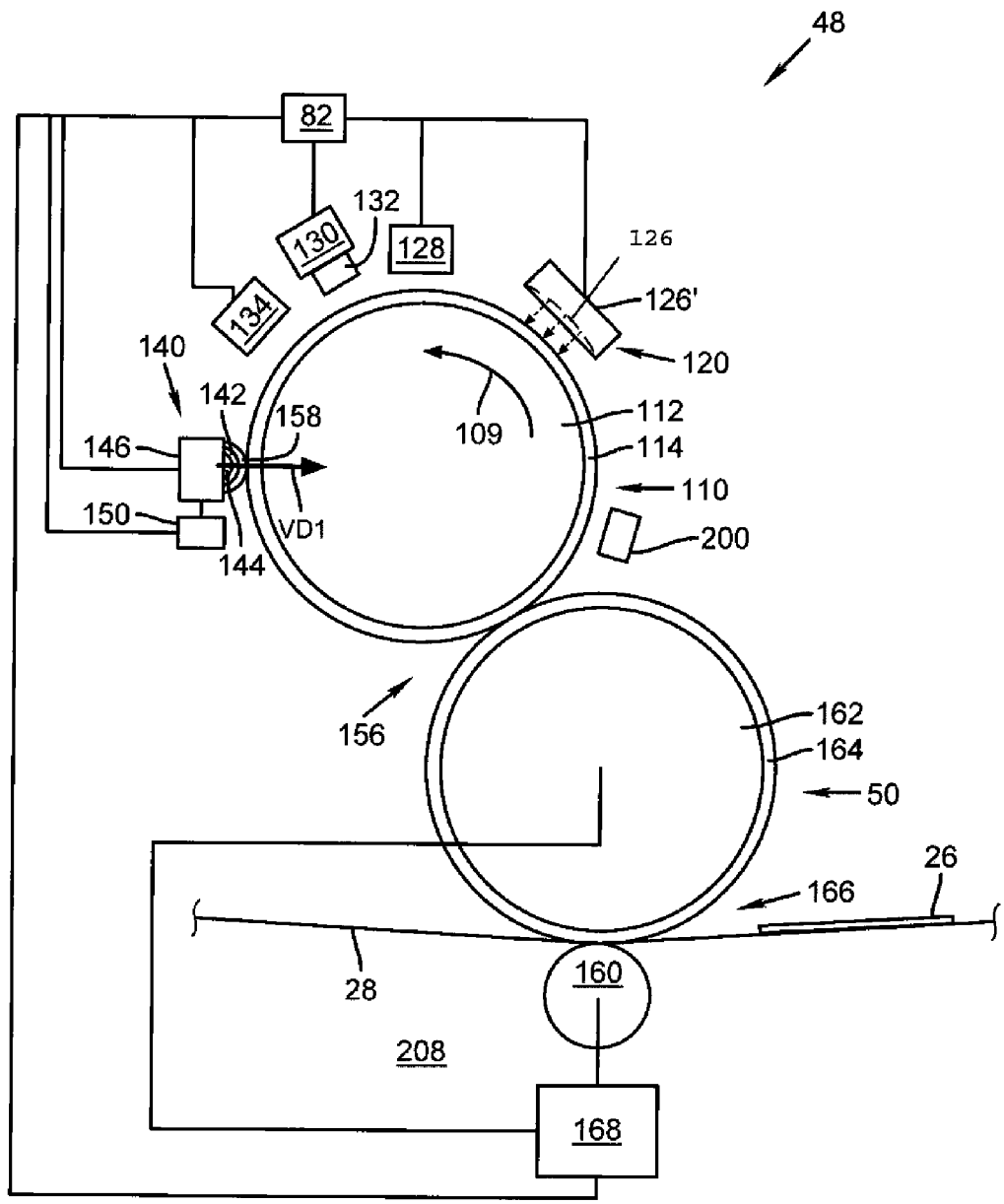
FIG. 2 shows an embodiment of a printing module in greater detail.
Figure 3:
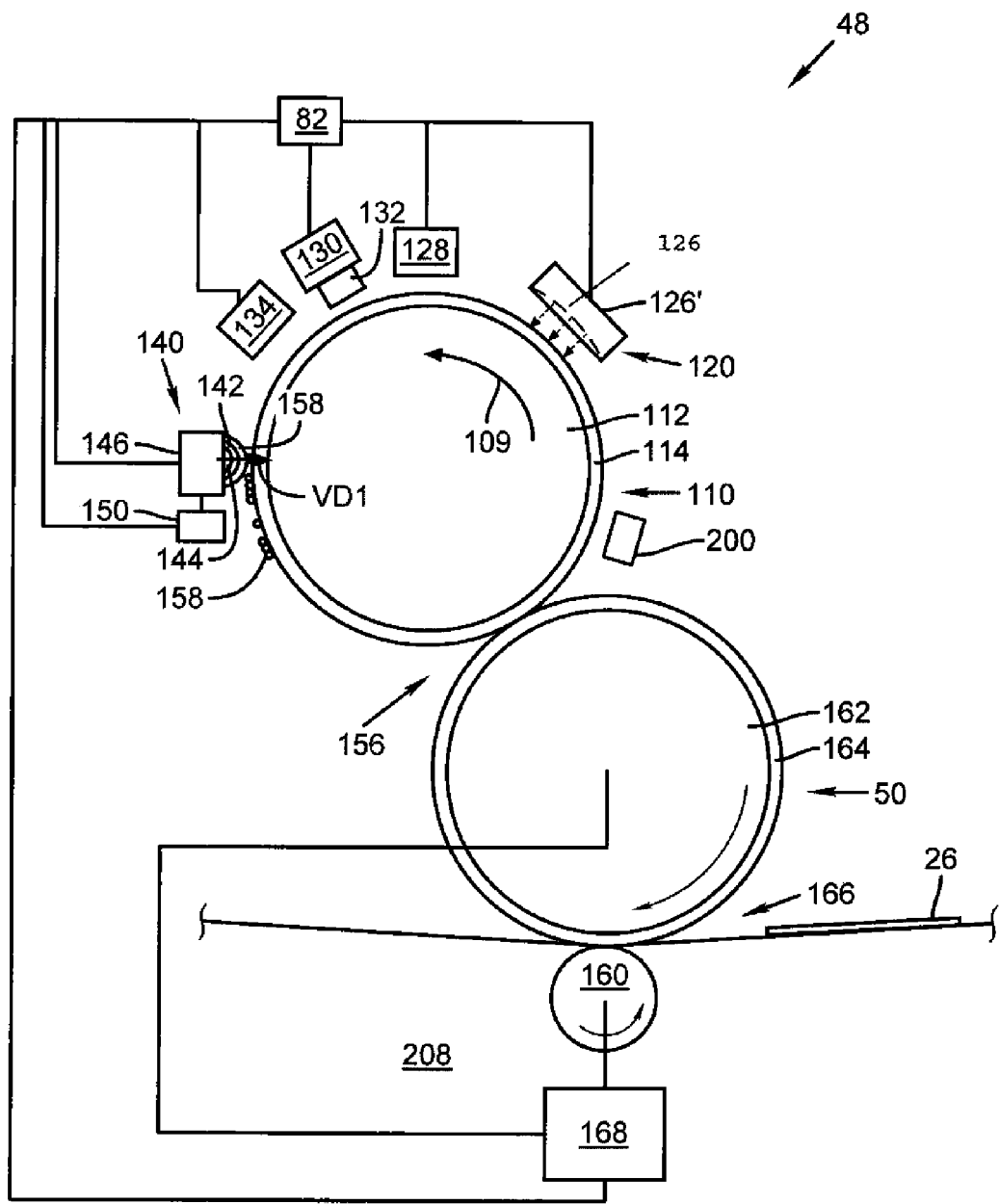
FIG. 3 shows the embodiment of FIG. 2 after writing and development.
Figure 4:
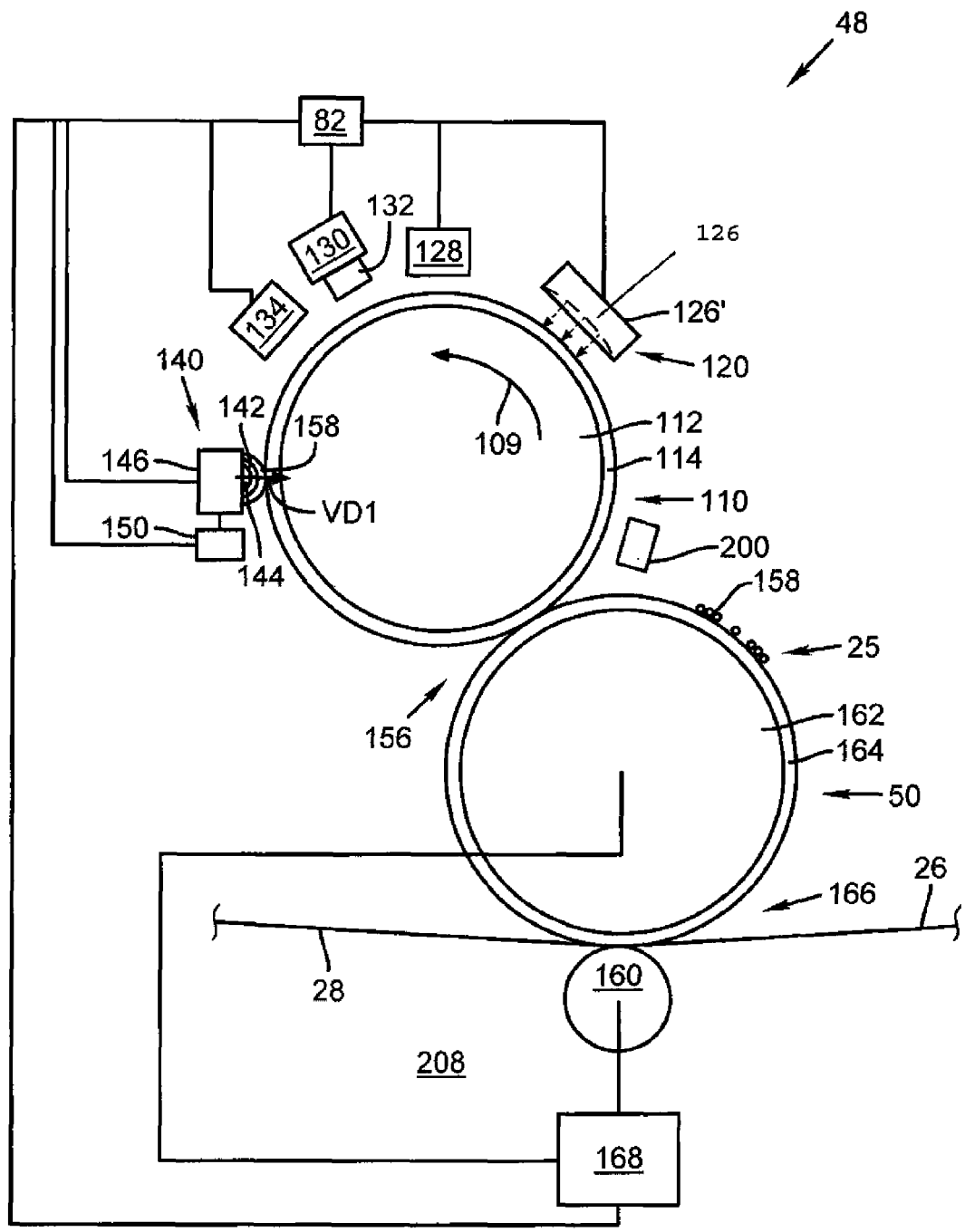
FIG. 4 shows the embodiment of FIG. 2 after transfer of a toner image to a transfer roller.

FIG. 1 is a system level illustration of a printer 20. In the embodiment of FIG. 1, printer 20 has a print engine 22 of an electrophotographic type that deposits toner 24 to form a toner image 25 in the form of a patterned arrangement of toner stacks. Toner image 25 can include any patternwise application of toner 24 and can be mapped according to data representing text, graphics, photo, and other types of visual content, as well as patterns that are determined based upon desirable structural or functional arrangements of the toner 24.

Toner 24 is a material or mixture that contains toner particles and that can form an image, pattern, or indicia when electrostatically deposited on an imaging member including a photoreceptor, photoconductor, electrostatically-charged, or magnetic surface. As used herein, "toner particles" are the particles that are electrostatically transferred by print engine 22 to form a pattern of material on a receiver 26A, 26B to convert an electrostatic latent image into a visible image or other pattern of toner 24 on receiver. Toner particles can also include clear particles that have the appearance of being transparent or that while being generally transparent impart a coloration or opacity. Such clear toner particles can provide for example a protective layer on an image or can be used to create other effects and properties on the image. The toner particles are fused or fixed to bind toner 24 to a receiver 26A, 26B.

Toner particles can have a range of diameters, e.g. less than 4 μm, on the order of 5-15 μm, up to approximately 30 μm, or larger. When referring to particles of toner 24, the toner size or diameter is defined in terms of the median volume weighted diameter as measured by conventional diameter measuring devices such as a Coulter Multisizer, sold by Coulter, Inc. The volume weighted diameter is the sum of the mass of each toner particle multiplied by the diameter of a spherical particle of equal mass and density, divided by the total particle mass. Toner 24 is also referred to in the art as marking particles or dry ink. In certain embodiments, toner 24 can also comprise particles that are entrained in a liquid carrier.

Typically, receiver 26A, 26B takes the form of paper, film, fabric, metallicized or metallic sheets or webs. However, receiver 26A, 26B can take any number of forms and can comprise, in general, any article or structure that can be moved relative to print engine 22 and processed as described herein.

Print engine 22 has one or more printing modules, shown in FIG. 1 as printing modules 40, 42, 44, 46, and 48 that are each used to deliver a single application of toner 24 to form a toner image 25 on receiver 26A or 26B. For example, the toner image 25 shown formed on receiver 26A in FIG. 1 can provide a monochrome image or layer of a structure or other functional material or shape.

Print engine 22 and a receiver transport system 28 cooperate to deliver one or more toner image 25 in registration to form a composite toner image 27 such as the one shown formed in FIG. 1 as being formed on receiver 26B. Composite toner image 27 can be used for any of a plurality of purposes, the most common of which is to provide a printed image with more than one color. For example, in a four color image, four toner images are formed each toner image having one of the four subtractive primary colors, cyan, magenta, yellow, and black. These four color toners can be combined to form a representative spectrum of colors. Similarly, in a five color image various combinations of any of five differently colored toners can be combined to form a color print on receiver 26A, 26B. That is, any of the five colors of toner 24 can be combined with toner 24 of one or more of the other colors at a particular location on receiver 26A, 26B to form a color after a fusing or fixing process that is different than the colors of the toners 24 applied at that location.

In FIG. 1, print engine 22 is illustrated as having an optional arrangement of five printing modules 40, 42, 44, 46, and 48, also known as electrophotographic imaging subsystems arranged along a length of receiver transport system 28. Each printing module delivers a single toner image 25 to a respective transfer subsystem 50 in accordance with a desired pattern. The respective transfer subsystem 50 transfers the toner image 25 onto a receiver 26A, 26B as receiver 26A, 26B is moved by receiver transport system 28. Receiver transport system 28 comprises a movable surface 30 that positions receiver 26A, 26B relative to printing modules 40, 42, 44, 46, and 48. In this embodiment, movable surface 30 is illustrated in the form of an endless belt that is moved by motor 36, that is supported by rollers 38, and that is cleaned by a cleaning mechanism 52. However, in other embodiments receiver transport system 28 can take other forms and can be provided in segments that operate in different ways or that use different structures. In operation, printer controller 82 causes one or more of individual printing modules 40, 42, 44, 46 and 48 to generate a toner image 25 of a single color of toner for transfer by respective transfer subsystems 50 to receiver 26A, 26B in registration to form a composite toner image 27. In an alternate embodiment, not shown, printing modules 40, 42, 44, 46 and 48 can each deliver a single application of toner 24 to a composite transfer subsystem 50 to form a combination toner image thereon which can be transferred to a receiver.

Printer 20 is operated by a printer controller 82 that controls the operation of print engine 22 including but not limited to each of the respective printing modules 40, 42, 44, 46, and 48, receiver transport system 28, receiver supply 32, and transfer subsystem 50, to cooperate to form toner images 25 in registration on a receiver 26A, 26B or an intermediate in order to yield a composite toner image 27 on receiver 26A, 26B and to cause fuser 60 to fuse composite toner image 27 on receiver 26A, 26B to form a print 70 as described herein or otherwise known in the art.

Printer controller 82 operates printer 20 based upon input signals from a user input system 84, sensors 86, a memory 88 and a communication system 90. User input system 84 can comprise any form of transducer or other device capable of receiving an input from a user and converting this input into a form that can be used by printer controller 82. Sensors 86 can include contact, proximity, electromagnetic, magnetic, or optical sensors and other sensors known in the art that can be used to detect conditions in printer 20 or in the environment-surrounding printer 20 and to convert this information into a form that can be used by printer controller 82 in governing printing, fusing, finishing or other functions. In the embodiment that is illustrated in FIG. 1, sensors 86 include a print imaging system such as a line scanner or any other form of device that can capture image information from a print 70 and with sufficient quality and reliability to enable the captured image to be used by printer controller 82.

Memory 88 can comprise any form of conventionally known memory devices including but not limited to optical, magnetic or other movable media as well as semiconductor or other forms of electronic memory. Memory 88 can contain for example and without limitation image data, print order data, printing instructions, suitable tables and control software that can be used by printer controller 82.

Communication system 90 can comprise any form of circuit, system or transducer that can be used to send signals to or receive signals from memory 88 or external devices 92 that are separate from or separable from direct connection with printer controller 82. External devices 92 can comprise any type of electronic system that can generate signals bearing data that may be useful to printer controller 82 in operating printer 20.

Printer 20 further comprises an output system 94, such as a display, audio signal source or tactile signal generator or any other device that can be used to provide human perceptible signals by printer controller 82 to feedback, informational or other purposes.

Printer 20 prints images based upon print order information. Print order information can include image data for printing and printing instructions and can be generated locally at a printer 20 or can be received by printer 20 from any of a variety of sources including memory system 88 or communication system 90. In the embodiment of printer 20 that is illustrated in FIG. 1, printer controller 82 has a color separation image processor 96 to convert the image data into color separation images that can be used by printing modules 40-48 of print engine 22 to generate toner images. An optional half-tone processor 98 is also shown that can process the color separation images according to any half-tone screening requirements of print engine 22.

FIGS. 2, 3, 4 and 5, show more details of an example of a printing module 48 representative of printing modules 40, 42, 44, and 46 of FIG. 1. In this embodiment, printing module 48 has a frame 208, a primary imaging system 110, a charging subsystem 120, a writing subsystem 130, a development station 140 and a cleaning system 200 that are each ultimately responsive to printer controller 82. Each printing module can also have its own respective local controller (not shown) or hardwired control circuits (not shown) to perform local control and feedback functions for an individual module or for a subset of the printing modules. Such local controllers or local hardwired control circuits are coupled to printer controller 82.

Primary imaging system 110 includes an electrostatic imaging member 112. In the embodiment of FIGS. 2-5 electrostatic imaging member 112 takes the form of an imaging cylinder. However, in other embodiments, electrostatic imaging member 112 can take other forms, such as a belt or plate. As is indicated by arrow 109 in FIGS. 2-5 electrostatic imaging member 112 is rotated by a motor (not shown) such that electrostatic imaging member 112 rotates from charging subsystem 120, to writing subsystem 130, to development station 140 and into a transfer nip 156 with a transfer subsystem 50 and past cleaning system 200 during a single revolution.

In the embodiment of FIGS. 2-5 electrostatic imaging member 112 has a photoreceptor 114. Photoreceptor 114 includes a photoconductive layer formed on an electrically conductive substrate. The photoconductive layer is an insulator in the substantial absence of light so that initial differences of potential Vi can be retained on its surface. Upon exposure to light, the charge of the photoreceptor in the exposed area is dissipated in whole or in part as a function of the amount of the exposure. In various embodiments, photoreceptor 114 is part of, or disposed over, the surface of electrostatic imaging member 112. Photoreceptor layers can include a homogeneous layer of a single material such as vitreous selenium or a composite layer containing a photoconductor and another material. Photoreceptor layers can also contain multiple layers.

Charging subsystem 120 is configured as is known in the art, to apply charge to photoreceptor 114. The charge applied by charging subsystem 120 creates a generally uniform initial difference of potential Vi relative to ground. The initial difference of potential Vi has a first polarity which can, for example, be a negative polarity. Here, charging subsystem 120 has a charging subsystem housing 126' within which a charging grid 126 is located. Grid 126 is driven by a power source (not shown) to charge photoreceptor 114. Other charging systems can also be used.

To provide generally uniform initial differences of potential charging, grid 126 is positioned within a narrow range of charging distances from electrostatic imaging member 112. Grid 126 in turn is positioned by housing 126', thus housing 126' in turn is positioned within the narrow range of charging distances from electrostatic imaging member 112. In this regard, both electrostatic imaging member 112 and housing 126' are joined to a frame 208 in a manner that allows such precise positioning. Frame 208 can comprise any form of mechanical structure to which charging subsystem and electrostatic imaging member 112 can be joined in a controlled positional relationship at least for printing operations. Frame 208 can comprise a unitary structure or an assembly of individual structures as is known in the art. As will be discussed in greater detail below in certain embodiments, during maintenance operations, it can be useful to allow housing 126' to be joined to frame 208 in a mariner that can be to be moved in a controllable fashion from the controlled positional relationship used for charging to a maintenance position. Frame 208 can support other components of printing module 48 including writing system 130, development system 140 and transfer subsystem 50.

As is also shown in FIGS. 2-5 in this embodiment, an optional meter 128 is provided that measures the electrostatic charge on photoreceptor 114 after initial charging and that provides feedback to, in this example, printer controller 82, allowing printer controller 82 to send signals to adjust settings of the charging subsystem 120 to help charging subsystem 120 to operate in a manner that creates a desired initial difference of potential Vi on photoreceptor 114. In other embodiments, a local controller or analog feedback circuit or the like can be used for this purpose.

Writing subsystem 130 is provided having a writer 132 that forms patterns of differences of potential on a electrostatic imaging member 112. In this embodiment, this is done by exposing electrostatic imaging member 112 to electromagnetic or other radiation that is modulated according to color separation image data to form a latent electrostatic image (e.g., of a color separation corresponding to the color of toner deposited at printing module 48) and that causes electrostatic imaging member 112 to have a pattern of image modulated differences of potential at engine pixel locations thereon. Writing subsystem 130 creates the differences of potential at engine pixel locations on electrostatic imaging member 112 in accordance with information or instructions provided by any of printer controller 82, color separation image processor 96 and half-tone processor 98 as is known in the art.

In the embodiment shown in FIGS. 2-5, writing subsystem 130 exposes the uniformly-charged photoreceptor 114 of primary imaging member 112 to actinic radiation provided by selectively activating particular light sources in an LED array or a laser device outputting light directed at photoreceptor 114. In embodiments using laser devices, a rotating polygon (not shown) is used to scan one or more laser beam(s) across the photoreceptor in the fast-scan direction. One dot site is exposed at a time, and the intensity or duty cycle of the laser beam is varied at each dot site. In embodiments using an LED array, the array can include a plurality of LEDs arranged next to each other in a line, all dot sites in one row of dot sites on the photoreceptor can be selectively exposed simultaneously, and the intensity or duty cycle of each LED can be varied within a line exposure time to expose each dot site in the row during that line exposure time. While various embodiments described herein describe the formation of an imagewise modulated charge pattern on a primary imaging member 112 by using a photoreceptor 114 and optical type writing subsystem 130, such embodiments are exemplary and any other system method or apparatuses known in the art for forming an imagewise modulated pattern differences of potential on a primary imaging member 112 consistent with what is described or claimed herein can be used for this purpose.

As used herein, an "engine pixel" is the smallest addressable unit of primary imaging system 110 or in this embodiment on photoreceptor 114 which writer 132 (e.g., a light source, laser or LED) can expose with a selected exposure different from the exposure of another engine pixel. Engine pixels can overlap, e.g., to increase addressability in the slow-scan direction (S). Each engine pixel has a corresponding engine pixel location.

In the embodiment of FIGS. 2-5, writer 130 receives printing instructions from controller 82, image processor or half toner processor containing printing instructions for each line of the image to be printed. The printing instructions include information from which an engine pixel level for each engine pixel location in the line can be determined. Writer 130 exposes an engine pixel location on primary imaging member 112 in an amount that is determined by the engine pixel level for the engine pixel location. As discussed above, generally, it is preferred that writer 130 provides a uniform density forming exposure response to particular engine pixel levels, hi this regard, writer 130 exposes different engine pixel locations on primary imaging member 112 in a manner that is calculated to cause each engine pixel location to be exposed to the engine pixel level that is determined for that engine pixel location.

Another meter 134 is optionally provided in this embodiment and measures charge within a non-image test patch area of photoreceptor 114 after the photoreceptor 114 has been exposed to writer 132 to provide feedback related to differences of potential created using writer 132 and photoreceptor 114. Other meters and components (not shown) can be included to monitor and provide feedback regarding the operation of other systems described herein so that appropriate control can be provided.

Development station 140 has a toning shell 142 that provides a developer having a charged toner 158 near electrostatic imaging member 112. Development station 140 also has a supply system 146 for providing the charged toner 158 to toning shell 142 and supply system 146 can be of any design that maintains or that provides appropriate levels of charged toner 158 at toning shell 142 during development. Often supply system 146 charges toner 158 using a technique known as tribocharging in which toner 158 and a carrier are mixed. During this mixing process abrasive contact between toner 158 and the carrier can cause small particles of toner 158 and materials such as coatings that are applied to the toner 158 to separate from the toner. These small particles can migrate to the electrostatic imaging member 112 during development to form at least some of residual material on electrostatic imaging member 112.

Development station 140 also has a power supply 150 for providing a bias for toning shell 142. Power supply 150 can be of any design that can maintain the bias described herein. In the embodiment illustrated here, power supply 150 is shown optionally connected to printer controller 82 which can be used to control the operation of power supply 150.

The bias at toning shell 142 creates a development difference of potential VDEV relative to ground. The development difference of potential VDEV forms a net development difference of potential between toning shell 142 and individual engine pixel locations on electrostatic imaging member 112. Toner 158 develops at individual engine pixel locations as a function of net development difference of potential. Such development produces a toner image 25 on electrostatic imaging member 112 having toner quantities associated with the engine pixel locations that correspond to the engine pixel levels for the engine pixel locations.

Figure 5:
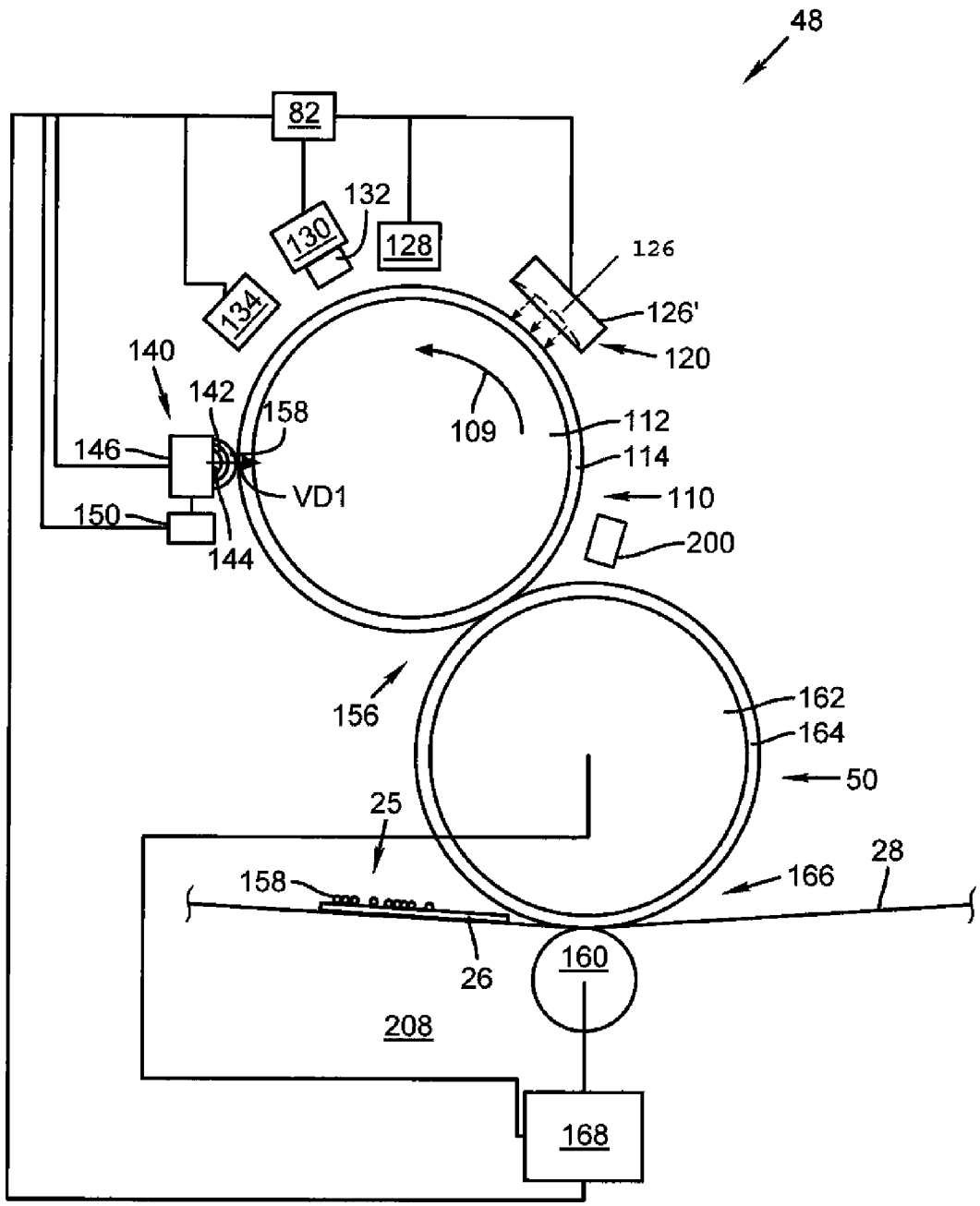
FIG. 5 shows the embodiment of FIG. 2 after transfer of a toner image to a receiver.
Figure 6:
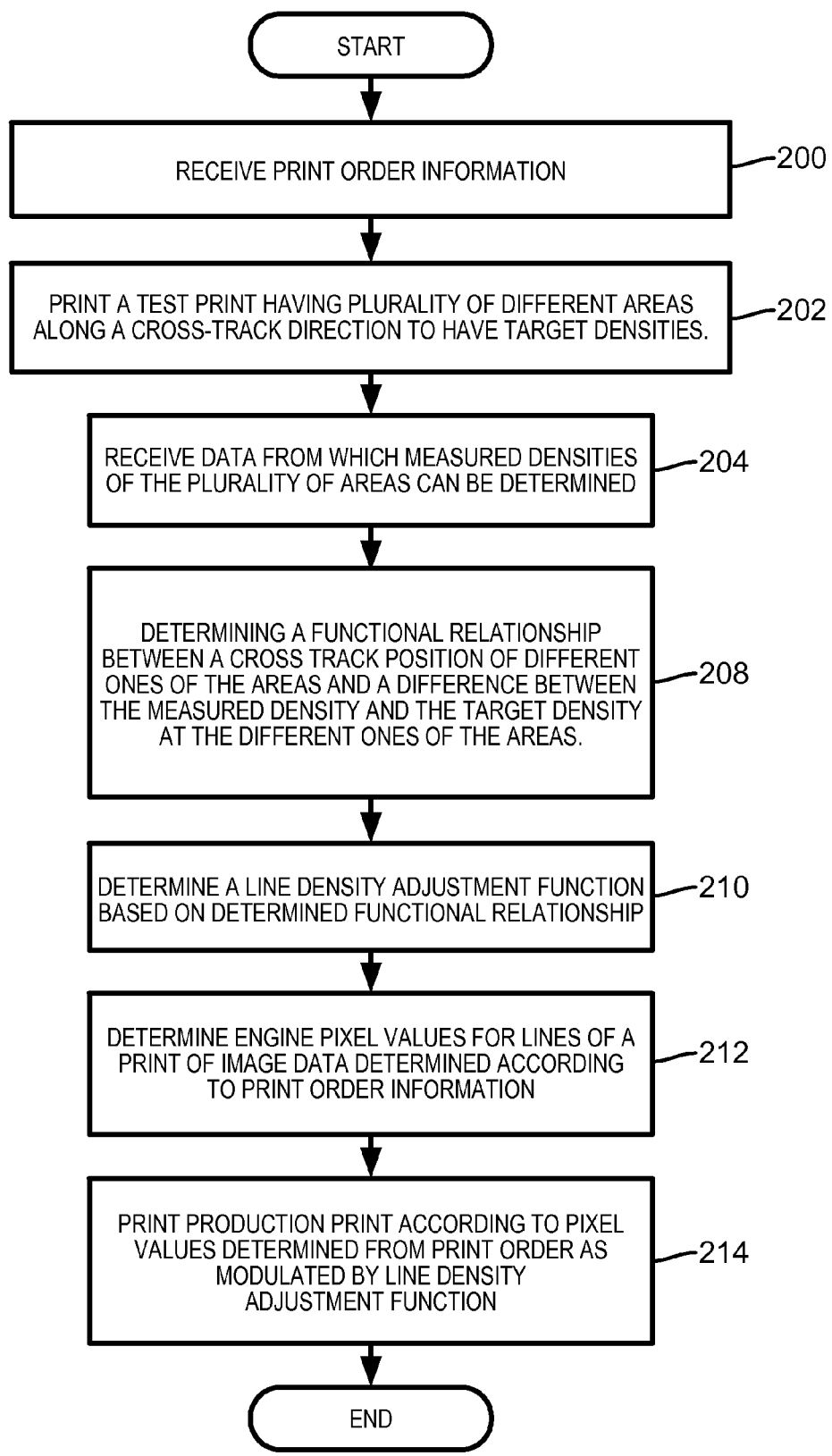
FIG. 6 shows a method for automatic cross-track density correction.

As is shown in FIG. 6, after a toner image 25 is formed, rotation of electrostatic imaging member 112 causes toner image 25 to move through a first transfer nip 156 between electrostatic imaging member 112 and a transfer subsystem 50. In this embodiment, transfer subsystem 50 has an intermediate transfer member 162 that receives toner image 25 at first transfer nip 156. As is shown in FIG. 5 toner image 25 is transferred to a receiver 26 when toner image 24 is moved through a transfer nip 166. This transfer can be assessed As is noted generally above, for a variety of reasons including but not limited to variations in design, manufacture, maintenance, or use, of printer 20 can cause imaging system 110 to form a toner image 24 having a density response to printing instructions at a first group of engine pixel locations that differs from the density response of a second group of engine pixel locations. A press operator faced with such a situation may not have the time, resources or expertise necessary to sort through the conditions giving rise to such differences and to make appropriate adjustments.

Accordingly, FIG. 6 illustrates a first embodiment of an automatic method for performing cross-track density corrections in printer 20. As is shown in the embodiment of FIG. 6, a source of print order information 100 provides print order data to controller 82. The print order data is associated with image data and optionally with printing instructions (step 200).

Controller 82 prints a test print having plurality of different areas along a cross-track direction to have target densities. These areas can include continuous tone areas or half-tone areas that are printed to have specific target densities. As discussed generally above, this is done by transmitting lines of pixel values that printing module to cause the formation of such target density areas on a receiver 26. This creates one or more prints having the plurality of areas along the cross-track direction that are expected to have the target densities (step 202).

This can be done in a variety of ways. In one embodiment, a test target is printed having test patches of known density arranged along the cross-track direction. In other embodiments, the known print density patches are printed in marginal areas of a print. In still other embodiments, the areas can comprise portions of image data from the print order or other photographic or electronic images.

Controller 82 receives data from which measured densities of the plurality of areas can be determined (step 204). This data can come from any of a variety of sources. The pixel values used to print in a plurality of different areas along the cross-track direction are known as is the density that printing according to such code values should generate in such areas. In one embodiment, sensors 82 include densitometers or colorimeters or other known technologies for detecting the color of an area of a print and that can sense the color or density of the print at a plurality of locations in a cross-track direction. In another embodiment, sensors 82 can include any type of digital image capture device such as a scanner or camera. It will be appreciated that any other form of density sensing device known in the art can be used for this purpose. In still other embodiments, sensors 82 can include an electrometer that measures the differences of potential used during printing of the target density areas.

Alternatively, external devices 92 can provide such data to controller 82. For example, such data can be provided from and external colorimeter, densitometer, scanner or camera.

Controller 82 determines a functional relationship between a cross-track position of different ones of the areas and a difference between the measured density and the target density at the different ones of the areas (step 208). This can be done in any of a variety of ways. One example of a way to determine this functional relationship will now be described in greater detail with respect to FIGS. 7A, 7B and 7C.

FIG. 7A illustrates target densities 218 for pixel locations in one example of a test print arranged along the cross-track direction. FIG. 7B illustrates measured densities at a plurality of target areas 220-236. For simplicity, in this example, the same target densities are used at each of printed areas 220, 222, 224, 230, 232, 234 and 236. However, as is illustrated in FIG. 7B, measurement data received by controller 82 indicates the density that is actually measured at printed areas 220, 222, 224, 230, 232, 234 and 236 and shows that there are differences in density as compared to the target densities. Where, as here, all of the target densities are the same, the magnitude of differences in density response at the various printed areas 220, 222, 224, 230, 232, 234, and 236 can be determined by evaluating differences in the absolute magnitude of the measured densities.

Figure 7C:
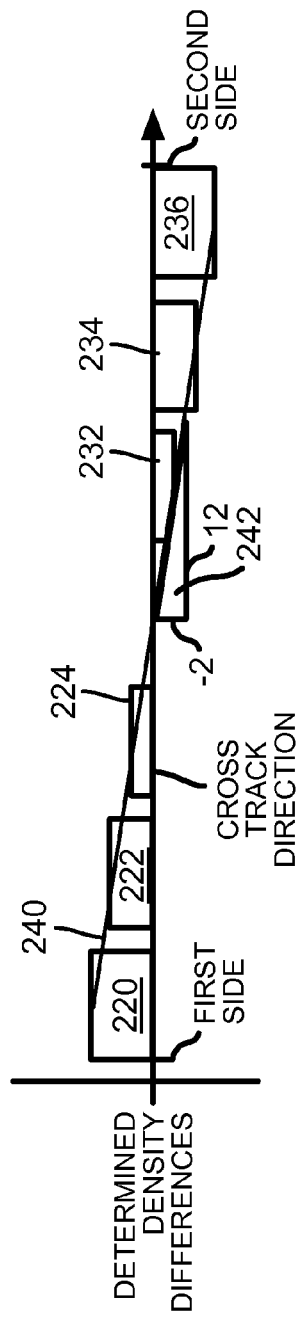
Figure 7D:
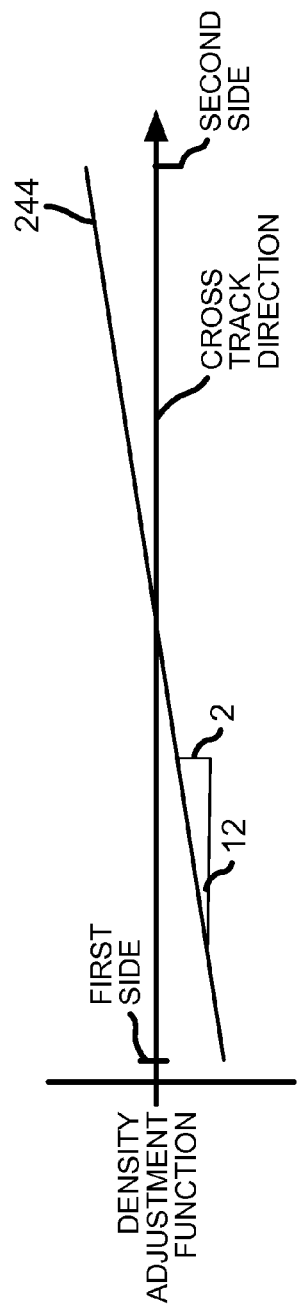

FIG. 7C illustrates the magnitudes of the unintended differences at printed areas 220, 222, 224, 230, 232, 234 and 236 as determined by controller 82 based upon the received measurement data. A functional relation between the magnitudes of the differences is then determined. In the example of FIG. 7C the differences in magnitude are used to determine a linear function 240. Here, this is done by determining a slope 242 that best fits the magnitudes of differences in density that arise at different areas along the cross-track direction. In one embodiment, this can be done using linear regression and in other embodiments in any other known way for fitting a linear function to a set of data that characterizes density differences observed at various positions along the cross-track direction can be used. Here, the regression indicates a slope 242 of $-(\frac{2}{12})$ or $-16.667$ percent characterizes the functional relationship.

In the example of FIGS. 7A-7D, controller 82 then uses the determined function to determine a density adjustment function (step 210). Here, the density adjustment function 244 is the inverse of the linear function 240 and therefore has a slope of $\frac{2}{12}$ or $16.667$ percent.

However, it will be appreciated that in other embodiments the steps of determining the magnitude of density differences and generating an adjustment function can be integrated. For example, the magnitude of the density differences can determined by subtracting the measured values for each area 220, 222, 224, 230, 232, 234, and 236 from the target density values 218 such that where the measured values exceed the target values a negative result is obtained and where the measured values are below the target values a positive magnitude is obtained.

Figure 8A:
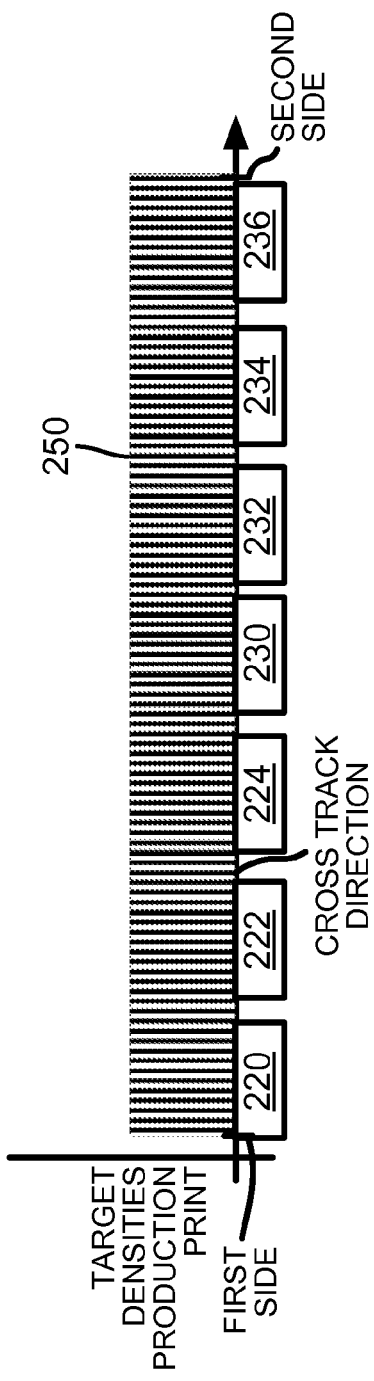
Figure 8B:
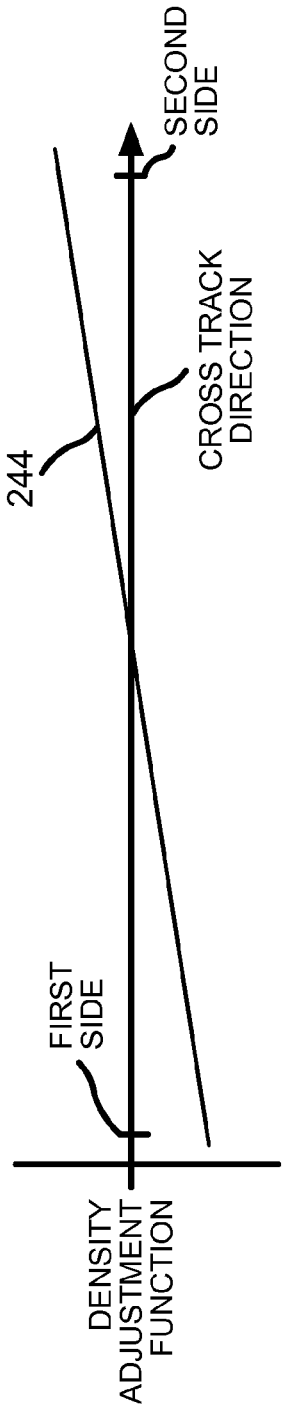

FIGS. 8A, 8B and 8C, illustrate an example application of the adjustment function 244. After determining adjustment function 244, controller 82 determines target density values for engine pixel locations along the cross-track direction for printing the ordered image. FIG. 8A illustrates a set of target density values 250 for each of the pixel locations in one line of the image data for a production or other subsequent image to be printed. For convenience, in this example, the target density values 250 for the ordered image are depicted as being the same.

Controller 82 then causes a printing module 48 to print a line having density values determined according to pixel values for the line and according to the line density adjustment function 244. In one embodiment illustrated in FIG. 8C this is optionally done by adjusting the pixel values according to the line density adjustment function. However, this approach can require that each individual pixel value be recalculated and then provided to the printing module which can require the transmission of substantial amounts of data. By using this adjusted data for printing, the measured densities of the printed line on the production or other print conform to the target densities as is illustrated in FIG. 8A.

In an alternative embodiment, however, the line density adjustment function is determined parametrically and data is provided to printing module 48 that characterizes the adjustment function such that a writer 130 or any other component of a printing module 48 can adjust the density response at each engine pixel location according to a function and the provided parameters. In certain embodiments, the data that characterizes the adjustment function that is to be applied can include, without limitation, mathematical functions, interpolation methods or applications, look up tables, fuzzy logic or any other logical expressions.

In other embodiments, the data that characterizes the adjustment function can comprise parametric data. For example, such parametric data is data that can be used to define certain aspects of a known function. For example, in one embodiment of the type shown in the example of FIGS. 7A-7D and 8A, 8B and 8D, the printer 20 can be defined with a line density adjustment function that is characterized simply by data from which a slope can be determined. In such an embodiment, the data from which a slope the adjustment function can be determined is provided to the printing module 48 or to a writer 130 which can use this data to define a slope of a corresponding cross-track adjustment that will be made to the density response at each of the pixels along the cross-track direction.

Optionally, such parametric data can provide other types of data that define the adjustments to be made to density response. These can include, but are not limited to, defining which of a plurality of different predetermined adjustment functions is to be used.

FIG. 8D, illustrates a possible outcome when the second print made using the adjusted target density values for the engine pixel locations. As is seen in this possible outcome, the use of such adjusted target density values can provide a second print with the target printed densities in areas 220, 222, 224, 230, 232, 234 and 236.

It will be appreciated that by determining a functional relationship between a measurements made at a plurality of different areas along a cross-track direction it becomes possible to detect unintended density variations that arise along the cross-track direction and to functionally relate these variations. The functional relationship used to determine an adjustment function that can be applied on a pixel-by-pixel basis allows the density response at each pixel to be individually determined without the complicated, time consuming and expensive processes of determining an individual density response for each specific pixel.

In particular, a function can be determined based upon a measurement data from a plurality of areas at a macro level (e.g. areas that include densities printed at a plurality of print engine locations). However, once determined the function can be applied to the different engine pixel locations based upon the cross-track position of the engine pixel locations to yield individualized results for each engine pixel location.

In the example of FIGS. 7A-7D and 8A-8D the adjustment function has been described and has been illustrated as a linear function determined according to a linear regression. However, any other method for determining a linear function can be used.

Further, a wide variety of other functions can be fit to the magnitudes of the unintended differences in density. These functions can include polynomial functions, piecewise continuous polynomial functions, and any other known functional relationships including but not limited to splines, statistical, logical, fuzzy logic or probabilistic functions.

Figure 10:
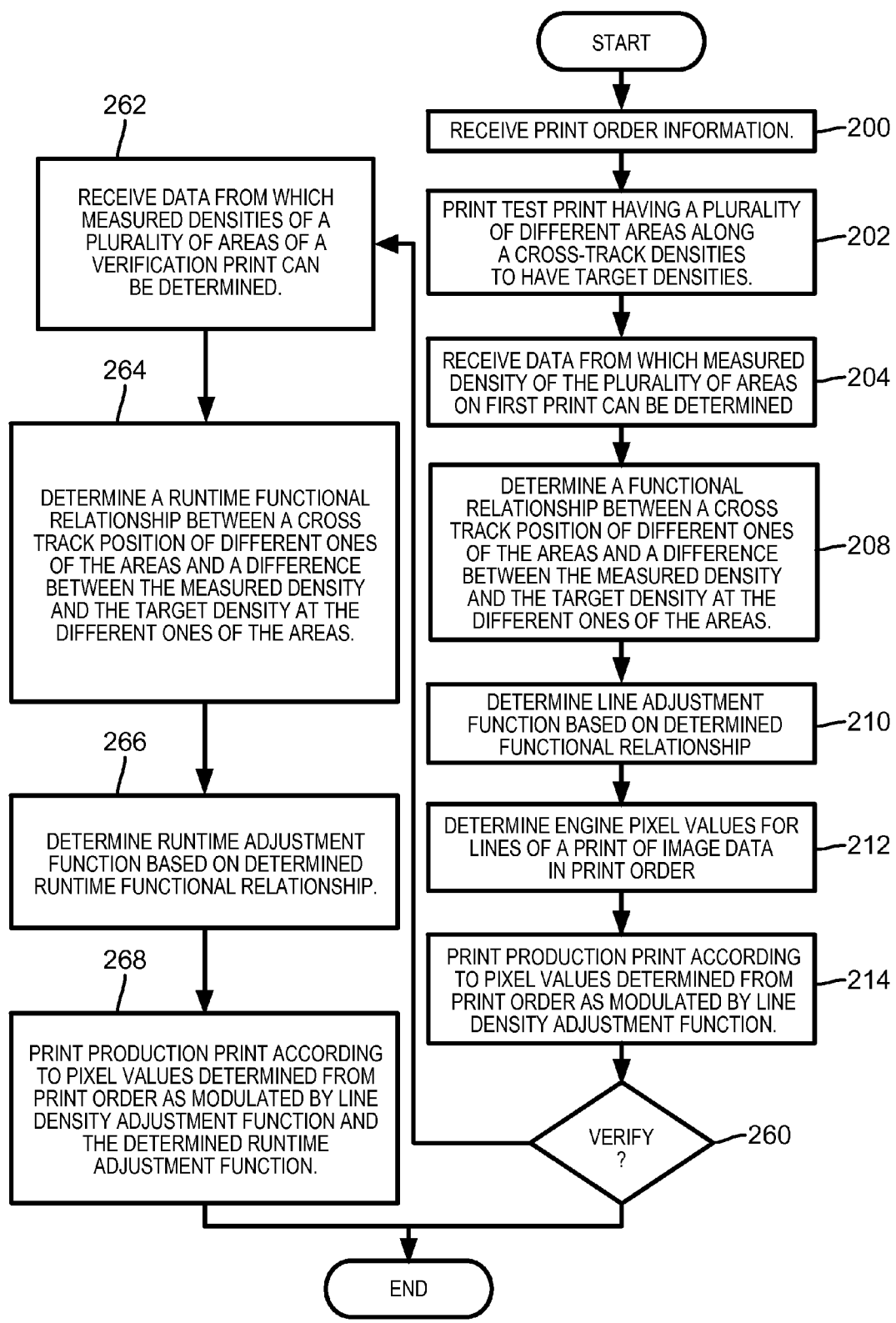
FIG. 10 illustrates another embodiment of a method for operating a printer including a verification process.

As is shown in FIG. 10, in an alternative embodiment, the method of FIG. 7 of determining compensation for low frequency cross-track-density variations can be performed in combination with the determination of high frequency and mid-frequency variation compensation adjustments. In this embodiment, a first print can be made having printed areas arranged across the cross-track direction and this print can be scanned to yield data that can be received by the controller 82 from which the measured density responses of pixels can be determined (step 204).

Controller 82 uses the received data to detect high frequency/mid-frequency variations in pixel-to-pixel density response along the cross-track direction (step 220) and to determine appropriate high-frequency and mid-frequency adjustments (step 222). Any known art for achieving these results can be applied by controller 82 for this purpose.

Controller 82 can determine the line density adjustment function (steps 208 and 210) based upon the data received. Because low frequency adjustments are being determined, it is not necessary to determine the density response at each individual pixel but rather a sample of individual responses can be used or a sample of average responses at a plurality of adjacent pixels at different areas along the cross-track direction can be used to determine the engine pixel data.

Controller 82 causes a production print to be made according to the line density adjustment function, the pixel values for the engine pixels in the image forming lines of the second print and according to any high-frequency and mid-frequency adjustments (step 224).

Figure 9:
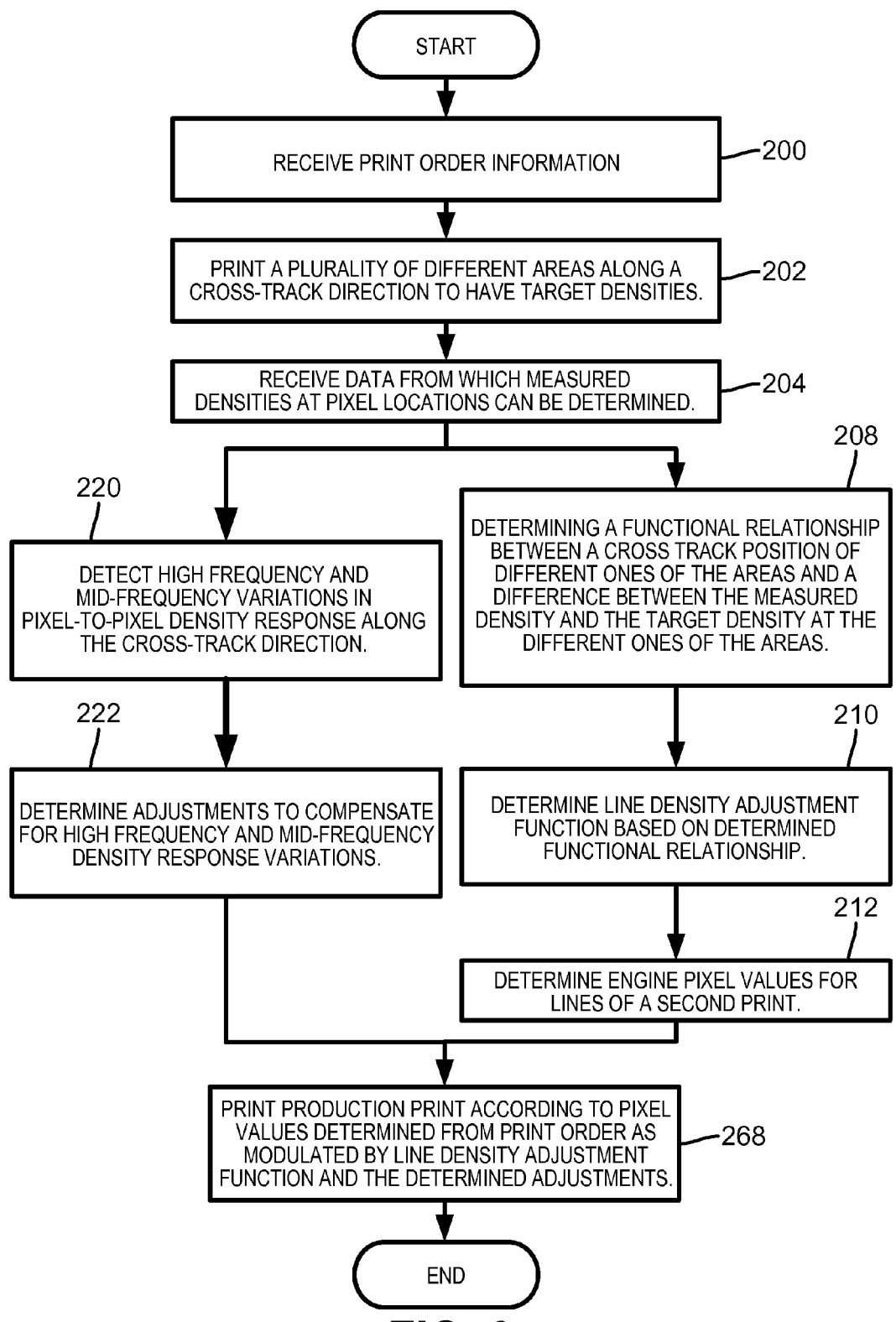
FIG. 9 illustrates another embodiment of a method for operating a printer including low frequency line density adjustments and separately high and mid-frequency line density adjustments.

In one alternative of the embodiment that is shown in FIG. 9, high frequency and mid-frequency variations can be detected (step 220) and adjustments can be determined (step 222) and applied by controller 82 in addition to the line density adjustment function during printing (step 224).

Figure 11A:
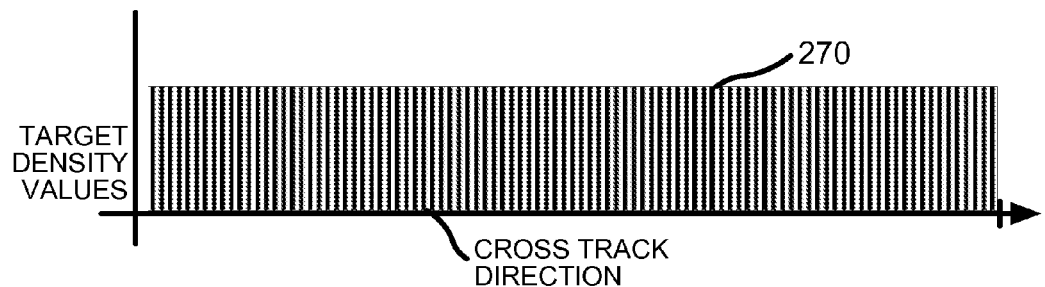
FIGS. 11A-11F illustrate one example of the verification process leading to a runtime line density adjustment.
Figure 11B:
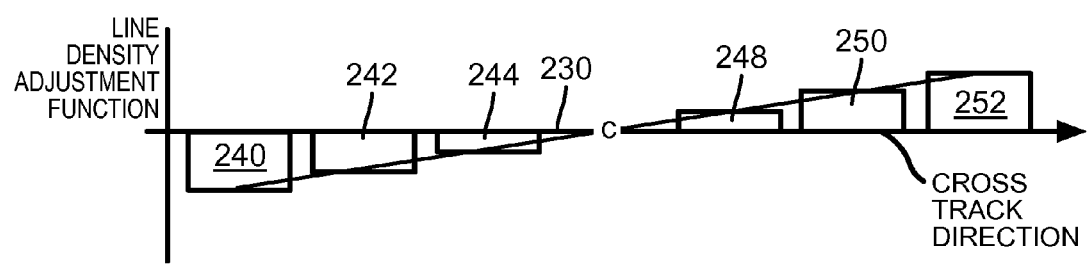
Figure 11C:
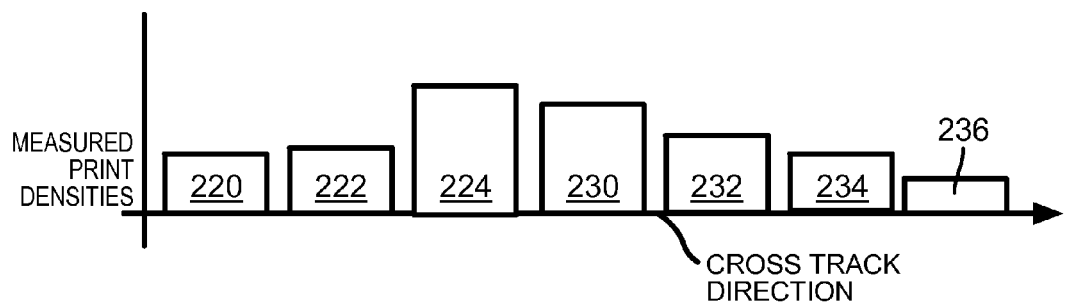
Figure 11D:
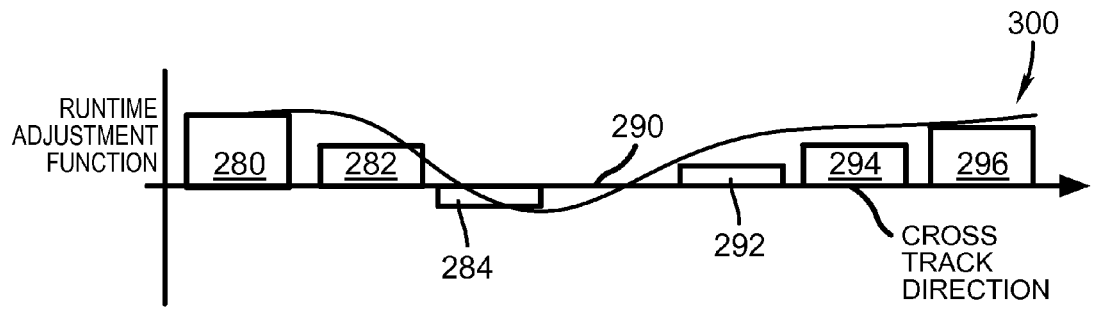
Figure 11E:
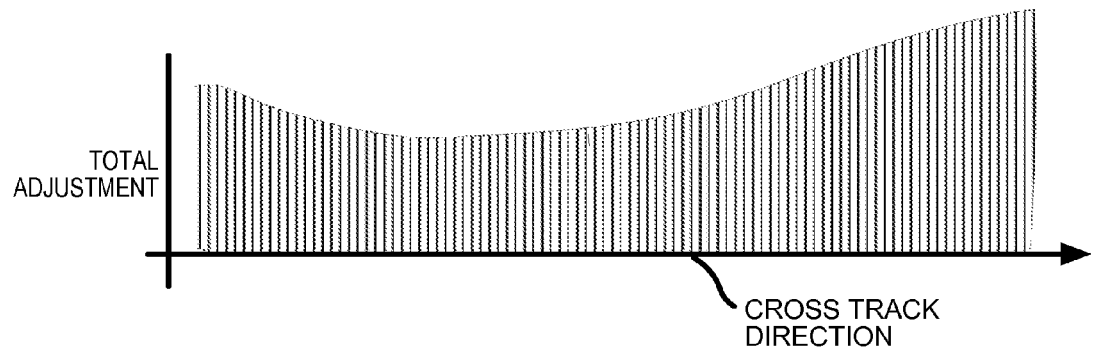
Figure 11F:
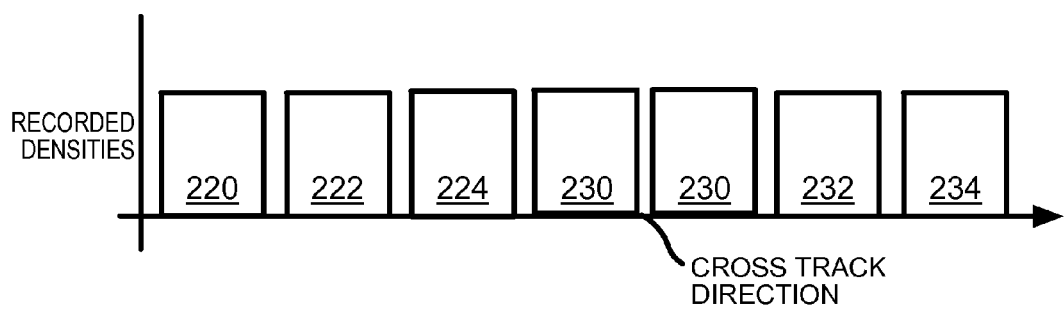

FIG. 10 illustrates yet another embodiment of a method for operating a printer. This embodiment includes the features of the method of FIG. 7 with the further steps of determining to verify the adjustment function (step 260) determining a runtime adjustment function to pixel values (step 262) and printing according to the line density adjustment function, the runtime adjustment function and the pixel values. The runtime adjustment function is provided because in many cases various components of a printer will have performance characteristics that can vary due to conditions that arise during printer operation. The change in performance characteristics can cause the printer to perform differently during a print run than at a time of set up and can cause unintended density variations along the cross-track direction even where initial cross-track adjustment functions are determined at the start of a job. Accordingly, it is frequently useful to also be able to apply corrections during a print run without having to disrupt the print job to insert a special test pattern. This can be accomplished adding steps of monitoring density responses at the plurality of areas of density and modifying the adjustment function as necessary to cause the FIGS. 11A-11E illustrate one example of the verification process leading to a runtime line density adjustment. As is shown in FIG. 11A, target density values 270 are printed on a verification print according the pixel values that are selected to cause the target density values 270 to be printed and according to a previously determined line density adjustment function shown in FIG. 11B. However, as is show in FIG. 11C despite the use of common density values and the line density adjustment function, variations in density response remain along the cross-track direction.

Accordingly, in this embodiment, when it is determine that the density response at the pixel locations should be verified, a runtime adjustment function 300 is determined. As is generally described above, this is determined by first determining the differences in magnitude between the densities measured at areas 280, 282, 284, 290, 292, 294, 296 on the verification print and the target densities printed at areas 280, 282, 284, 290, 292, 294, and 296 on the verification print and then determining a runtime functional relation between the differences in magnitude (step 264) and generating an adjustment function based upon the determined runtime functional relation (step 266). Here, the runtime adjustment function 300 is a polynomial that is continuous, however, in other embodiments, the runtime adjustment function can comprise a piecewise continuous polynomial function or any other known functional relation.

Further printing is then performed based upon the pixel values for each line to be printed, the line density adjustment function and the runtime adjustment function (step 268).

It will be appreciated that in general, the combined runtime adjustment function and line density adjustment function provide a baseline adjustment against which density verification measurements during the run will be compared and the writer 130 or other components controlling print density in printing module 48 are adjusted so that the deviations from the expected performance when the line density adjustment function is applied are maintained within the desired level. In some embodiments, the runtime adjustment function can be determined within a few prints, such as within the first 25 prints after the line density adjustment function has been determined, as larger numbers of prints can be accompanied by a drift in the output of the print engine causing deviations from the corrected print test pattern to occur.

Signals corresponding to the printed density of a uniform test pattern across the width of the print are measured. These signals can be electronic, i.e. output signals from densitometers, voltmeters, mass detection sensors, and the like that correspond to the density of the printed image. The output signal is then fit to a polynomial function or a piecewise continuous polynomial function. That function is then used to determine a correction factor needed to correct each of the pixels. Thus, any errors associated with noises in the measurements or noises in the printing of the pixels are averaged out and the corresponding corrections that are applied are robust against such noises. This mode of practicing this invention is generally useful when starting a print engine or a print job as a special test print is required that has uniform density across the print This process is especially suitable for maintaining color balance in a color print made by overlaying toners corresponding to separations made using the subtractive primary colors cyan, magenta, yellow, and black. In this instance the density of each color is separately measured and adjusted. While this method of practicing the invention can be used by measuring the densities on the primary imaging member, a transfer intermediate member, or a receiver member, it is preferable to measure the densities on the receiver after fusing as the toners corresponding to the subtractive primary colors will blend with each other during fusing and affect the color balance and density.

While the technology described in this patent is illustrated by its applicability to an electrophotographic print engine, it is also recognized that is practice is suitable for other types of digital print engines such as ink jet print engines. To practice this invention with an inkjet print engine, the test print is made by depositing droplets of ink onto a suitable receiver such as paper. The density of the printed patches is determined and fit to a polynomial function or piecewise continuous polynominal function and the values of that function at each pixel is compared to that required to print the density called for by the test pattern. Corrections are then made by adjusting the amount of ink jetted onto the receiver in a manner consistent with the specific ink jet jetting technology employed by that ink jet print engine.

This invention is also suitable for practice in thermal print engines whereby a controlled amount of heat applied to a transfer medium transfers a controlled amount of dye to a receiver such as paper.

What is claimed is:

1. A method for automatic cross-track density correction for a print engine having a print head that forms lines of picture elements on a receiver based upon lines of pixel values comprising:

causing the print engine to print a first print having a plurality of different areas along a cross-track direction with target densities;

receiving data from which measured densities for different ones of the plurality of different areas can be determined;

determining a line density adjustment function based upon a functional relationship between a cross track position of different ones of the areas and a difference between the measured density and the target density at the different ones of the areas; and subsequently printing a production print according to lines of pixel values for the production print modulated by the line density adjustment function.

2. The method of claim 1, wherein the line density adjustment function is a linear function having a slope determined according to the differences in density.

3. The method of claim 1, wherein the line density adjustment function is a polynomial.

4. The method of claim 1, wherein the line density adjustment function is a spline fit.

5. The method of claim 1, wherein the line density adjustment function is a piecewise continuous function.

6. The method of claim 1, wherein a controller further detects high frequency variations in pixel-to-pixel density response, determines adjustments to compensate for high frequency variations in density response, and subsequently prints a production print according to lines of pixel values for the production print modulated by the line density adjustment function and according to the determined adjustments.

7. The method of claim 1, wherein a controller further performs a verification process wherein data is received from which measured densities of a plurality of areas of a verification print can be determined, a runtime functional relationship between a cross track position of different ones of the areas and a difference between the measured density and the target density at the different ones of the areas is determined, a runtime adjustment function is determined based on determined runtime functional relationship; and wherein a subsequent production print is printed according to pixel values determined from print order as modulated by the line density adjustment function and the determined runtime adjustment function.

8. The method of claim 1, further comprising a scanner, line imager or electrometer capable of determining information from which image density can be determined.

9. The method of claim 6, wherein the line modulation function comprises a linear function without changing an average exposure, such that a reduction in exposure at a first area of the plurality of areas necessitates a commensurate increase in exposure at a second area of the plurality of areas.

* * * * *